United States Patent Office 3,700,634
Patented Oct. 24, 1972

3,700,634
ACETIC ANHYDRIDE MODIFIED
DISPROPORTIONATED ROSIN
Charles Glenn Wheelus, Panama City, Fla., assignor to
Arizona Chemical Company, New York, N.Y.
No Drawing. Original application Nov. 27, 1968, Ser. No.
779,600, now Patent No. 3,583,934, dated June 8,
1971. Divided and this application Apr. 24, 1970, Ser.
No. 31,804
Int. Cl. C09f 1/04
U.S. Cl. 260—97.5    2 Claims

ABSTRACT OF THE DISCLOSURE

In synthetic rubber manufacturing processes wherein aqueous emulsions of butadiene and styrene or butadiene and acrylonitrile or other vinyl monomer are prepared with an emulsifying agent containing a water-soluble soap of a disproportionated rosin and are polymerized in the presence of a free radical catalyst system, the adverse action of free oxygen on the polymerization is offset by heat-modifying the disproportionated rosin before it is converted into its soap. This is done by heating it at about 250°–300° C. for about 1 to 4 hours in admixture with about 0.5% to 5% of its weight of acetic anhydride.

---

This is a division of application Ser. No. 779,600, filed Nov. 27, 1968. This invention relates to emulsion polymerization processes, such as those used in the manufacture of synthetic rubbers, wherein aqueous emulsions of a diolefin such as butadiene and a vinyl monomer such as styrene or acrylonitrile are prepared and the unsaturated monomers are copolymerized in the presence of a free radical catalyst system. More particularly, the invention is directed to improvements in these processes wherein the adverse effect of free oxygen on the copolymerization reaction is offset or counteracted by the use of a new class of disproportionated rosin soaps in preparing the monomer emulsions.

In synthetic rubber manufacturing processes of this type, and particularly in the manufacture of GRS–10 and nitrile rubbers, the alkali metal and other water-soluble soaps of disproportionated rosin are commonly used as emulsifying agents, either alone or admixed with fatty acid soaps. Standard recipes employing these and other similar emulsifying agents are described, for example, in Whitby, "Synthetic Rubber" (1954 edition) Page 217. A typical GRS formulation that is used both commercially and in the laboratory is the "1500-type SBR recipe". Other recipes for use in nitrile rubber formulations, in GRS latexes of either high or low solids, and other processes wherein diolefins such as butadiene or mixtures thereof with styrene, acrylonitrile, alkyl acrylates, 2-vinylpyridine and the like are emulsified in aqueous systems and polymerized with free radical catalysts are also described in this book.

The polymerization catalysts and catalyst systems used in these emulsion polymerizations are also described in the Whitby book. They include persulfate catalysts such as potassium persulfate, peroxide catalysts such as cumene hydroperoxide, hydrogen peroxide and the like, and redox systems such as those in which ferrous sulfate and sodium formaldehyde sulfoxylate are used with para-menthane hydroperoxide. Modifiers such as dodecyl mercaptan and electrolytes such as sodium phosphates and potassium chloride may also be present.

Emulsion polymerization processes of these types are seldom carried to completion. Ordinarily the polymerization is so conducted that about 60% to 70% of the monomers are polymerized, after which it is short-stopped and the reactor is discharged and refilled with fresh emulsion. Under these circumstances it is difficult or impossible to prevent small amounts of oxygen from finding its way into the reactor and in many cases, therefore, the polymerization must be carried out in the presence of oxygen. This is very undesirable, as free oxygen lengthens the induction period of most of the above-described polymerization systems and may seriously reduce the daily output of the plant.

My present invention is based on the discovery that this adverse effect of oxygen can be offset or overcome to a substantial extent by the presence in the polymerization system of a new class of disproportionated rosin soaps. These are the alkali metal, ammonium and amine salts of disproportionated rosin that has been modified by mixing it with about 0.5% to 5% of acetic anhydride and heating the mixture at about 250° C. to 300° C. or slightly higher for about 1 to 4 hours. Acetic anhydride-modified rosin of this character is a new article of commerce, and will be sold as such to synthetic rubber manufacturers for conversion into the water-soluble soaps that are used as emulsifying agents in preparing synthetic rubber-producing compositions. The soaps of the acetic anhydride-modified disproportionated rosin with alkali metal hydroxides or carbonates, or with ammonia or amines such as morpholine are also new products, and are claimed as such.

This aspect of my invention therefore includes the new acetic anhydride-modified disproportionated rosin, its water-soluble soaps, aqueous butadiene-styrene and other synthetic rubber-producing emulsions containing the new soaps as emulsifying agents, and methods of producing synthetic rubbers in which these emulsions are polymerized.

In my copending application Ser. No. 692,713, filed Dec. 22, 1967 now abandoned, I have shown that disproportionated rosins can be heat-modified by holding them at about 250° to 300° C. for about 1 to 18 hours and that the water-soluble soaps of such heat-modified rosins, when incorporated into aqueous butadiene-styrene emulsions in the usual quantities of about 1% to 8% on the weight of solids present, will counteract the adverse effect of oxygen on their copolymerization into synthetic rubber. The emulsions containing these soaps also polymerize faster than those prepared with other emulsifying agents under comparable polymerizing conditions in the absence of oxygen. I have now discovered that these same advantages are obtained when the same disproportionated rosins are heat-treated for much shorter times after admixture with about 0.5% to 5% of their weight of acetic anhydride.

Although my invention is not limited to any theory of operation, I believe that the acetic anhydride accelerates the formation of anhydrides of the rosin acids contained in disproportionated rosins (see, for example, U.S. Pat. No. 2,138,183). I have shown that such anhydrides are present by the following procedures. A sample of a disproportionated rosin, heat modified by incorporating uniformly 1% by weight of acetic anhydride and heating for 2 hours at 300° C., is converted into its potassium soap by reaction with aqueous potassium hydroxide. A weighed portion of this soap is acidified with mineral acid to free its organic acids which are extracted with ether and washed with water to remove mineral acids and acetic acid. The acid number of the extracted acids is determined and compared with the acid number of the treated rosin.

The acid number of the treated rosin is always lower by at least 1% to 5%, and in many cases it may be as much as 20–25% lower; typical figures will be shown later in Table I. The process of my present invention can therefore be defined accurately by stating that the disproportionated rosin is heated at 250° C. to 300° C. and preferably about 290–300° C. in the presence of about 0.5% to 5% and preferably about 1% to 4% of its weight of acetic anhydride, uniformly admixed therewith, until a substantial rosin acid anhydride formation has occurred. For most disproportionated rosins this result is obtained in from 1 hour to about 4 hours under these conditions. A heating schedule of about 2 hours at 290°–300° C. or slightly higher after adding 1% to 2% of acetic anhydride is preferred.

A particularly important feature of my invention is the application of its principles to tall oil rosin. Soaps of disproportionated tall oil rosin are used commercially in synthetic rubber recipes, such as those for GRS–10 rubbers, with results that are about the same as those obtained with disproportionated wood rosin. I have found, however, that outstanding results are obtained when disproportionated tall oil rosins are heat-modified in accordance with my present invention and then converted into water-soluble soaps; these soaps give greatly improved polymerization rates when used as emulsifiers in free radical type emulsion polymerization recipes. Thus, for example, the presence of about 1% to 8% of the potassium soap of one of the new disproportionated rosins, modified by heating with acetic anhydride, in styrene-butadiene emulsion polymerization systems will result in from 20% to 30% reductions in the time required to reach 60–70% conversion at 5° C.

The disproportionated rosin used as starting material in practicing the invention is a rosin wherein two atoms of hydrogen have been removed from the two-double bond abietic-type acids with rearrangement to form an aromatic nucleus; as used herein it is a rosin wherein the abietic acid content has been reduced by this procedure to less than five percent and preferably to not more than about 1%. This is done commercially by heating the rosin in the presence of a disproportionation catalyst such as iodine, sulfur, or palladium or platinum as described in U.S. Pat. No. 2,138,183. See also U.S. Pat. No. 2,479,226, wherein the disproportionation reaction is applied to tall oil and alkali metal salts of the product are used in butadiene-styrene polymerizations.

In producing my new heat-modified rosins the disproportionated rosin is heat-modified in the presence of acetic anhydride as described above until the product, after conversion into its sodium, potassium or other alkali metal soap, demonstrates a faster conversion of butadiene-styrene emulsion into synthetic rubber when tested in a standard SBR recipe in comparison with a soap of the same rosin before the modification. A measurable improvement is obtained after heating with 1% to 4% of acetic anhydride for one hour at 250°–270° C., but it is advisable to continue heating for from 2 to 4 hours. At higher temperatures, however, and especially in the range of about 290° C.–300° C. the modification proceeds much more rapidly and the desired improvement is obtainable in considerably less time. Heating temperatures up to 325° C. may be used for short times on the order of 0.5–2 hours, but care must be taken to avoid excessive decarboxylation of the rosin.

The heat-modified rosins resulting from this process are new articles of commerce and will be sold as such to synthetic rubber manufacturers for conversion into their alkali metal, ammonium or amine soaps such as the sodium, potassium and morpholine salts. These may be prepared separately by reacting the rosin with aqueous solutions of hydroxides or carbonates of the alkali metal, or with ammonium hydroxide, or with a volatile amine such as morpholine, or the soap may be formed in situ by adding its ingredients to the polymerization recipe.

The reasons why soaps of the new heat-modified disproportionated rosins give improved conversions in the emulsion polymerization of olefins and polyolefins have not been definitely determined. It seems likely that they produce soap micelles of more favorable character, for it is generally agreed that these polymerizations are initiated in such micelles. Rosins, being natural products, may contain substances which act as inhibitors in the polymerization reaction. These compounds may be altered by the heat-treating conditions in such a manner that they no longer act as inhibitors. It will be understood, however, that the invention is not primarily dependent on these or other theoretical possibilities, the controlling fact being that improved conversions are obtained when the soaps of heat-modified disproportionated rosin are used in olefin polymerizations.

It will also be understood that the decreased time of polymerization is obtainable in any aqueous emulsion polymerization system in which rosin soaps are used. Thus, in addition to GRS rubber, the new soaps may be used in nitrile rubber formulations, in GRS latexes of either high or low solids, and in general wherever polyolefins such as butadiene or mixtures thereof with styrene, acrylonitrile, alkyl acrylates, 2-vinylpyridine and the like are polymerized in aqueous systems, usually at temperatures ranging from about 4° C. to about 50°–60° C. It will also be understood that they may be used with any of the catalyst systems normally employed in these polymerizations. It will be seen therefore, that the new soaps of the invention may be used in any of the presently-known emulsified olefin polymerization systems.

A standard type of formulation in wide commercial use for the production of cold rubber is the sulfoxylate recipe, in which the activator contains sodium formaldehyde sulfoxylate, ferrous sulfate and Versene Fe-3 or other chelating agent. See Whitby, "Synthetic Rubber" (1954 edition), page 217. A typical GRS formulation that is used both commercially and in the laboratory is the "1500-type SBR recipe." When used for test purposes this is as follows:

Laboratory 1500 Recipe

The following components are charged to a 32-ounce bottle and polymerization is allowed to take place for 8 hours at 5° C.

| | |
|---|---|
| Butadiene | 107 grams, freshly distilled. |
| Styrene | 46 grams, stabilized with t-butyl-pyrocatechol. |
| Water | 275 g. |
| Potassium soap of disproportionated rosin | 6.90 g. 100% solids basis. |
| Tamol N [1] | 0.150 g. |
| | 0.610. |
| Electrolyte (KCL) | 0.610. |
| EDTA (chelating agent) | 0.025 g., 100% tetra sodium salt of ethylene-diamine tetracetic acid basis. |
| Tertiary dodecyl mercaptan | 0.310 g. 100% basis. |
| p-Menthane hydroperoxide | 0.038–0.046 g., 100% basis. |
| Sodium formaldehyde sulfoxylate | 0.036–0.043 g. |
| Ferrous sulfate | 0.013–0.015 g. |

[1] Tamol N is a salt of a naphthalene sulfonate-formaldehyde condensate

Oxygen is a known inhibitor in the polymerization of styrene-butadiene. Since it is difficult to remove all traces of oxygen from a commercial polymerization system, air is sometimes deliberately introduced into the experimental system at the rate of 4 ml. per 100 g. monomer to determine its effect on the polymerization. This is equivalent to 6.2 ml. in the recipe outlined above. This was done in all of the present examples except where otherwise stated.

The charging procedure is as follows: The potassium soap of disproportionated rosin, Tamol N, and KCL are dissolved in 200 g. distilled water and adjusted with 2 N KOH to a pH of 10.5. This solution, along with 75 ml. additional distilled water, is charged to a bottle previously sparged with nitrogen. Styrene, less an amount used to dissolve the para-menthane hydroperoxide and tertiary dodecyl mercaptan, is added to the bottle. The tertiary dodecyl mercaptan and para-menthane hydroperoxide separately dissolved in styrene are added next to the bottle. A slight excess of butadiene is weighed into the bottle, the excess allowed to evaporate, and the bottle quickly capped with a metal cap and neoprene seal. The cap has a small hole so that solutions may be added and samples removed through the neoprene seal by use of a hypodermic syringe.

The sodium formaldehyde sulfoxylate, sodium TDTA, and ferrous sulfate are dissolved in water under a nitrogen blanket. The bottles are placed in racks in a polymerization apparatus which is maintained at 5° C. The bottles are rotated until the contents are thoroughly emulsified and chilled. An appropriate amount of the ferrous sulfate, sodium formaldehyde sulfoxylate, and sodium EDTA solution is charged to each bottle and the bottles are rotated 8 hours after which the reaction is short-stopped.

After reaction times of 8 hours the amount of solids is determined. The percent conversion of monomer to polymer is calculated from this figure.

Alkali metal soaps of the heat-modified disproportionated tall oil rosins of the invention can also be used as emulsifying agents in making nitrile rubber. Thus, for example, they can be substituted for the soap flakes in the recipe shown on page 802 of the Whitby publication cited above.

The invention will be further described and illustraeed by the following examples, which described specific embodiments thereof. It will be understood, however, that although these examples may show certain features in detail, the invention in its broader aspects is not limited thereto.

The rosin used in Example I was a catalytically produced disproportionated tall oil rosin, prepared as described in U.S. Pat. No. 2,138,183 and having the following characteristics:

| | |
|---|---|
| Acid number | 167 |
| Saponification number | 173 |
| Unsaponifiables, percent | 7.0 |
| Abietic acid (U.V.), percent | 0.7 |
| Optical rotation | +53 |
| Softening point, ° C. | 74 |

The tall oil rosin used in the remaining examples was disproportionated by heating at 280°–350° C. for about 1 to 6 hours in the presence of about 0.1% to 1% of a phenol sulfide of the type of thiobis mono- and polyhydric phenols as described in U.S. Pat. No. 3,377,334. This rosin has the following properties:

| | |
|---|---|
| Acid number | 157 |
| Unsaponifiables, percent | 9 |
| Abietic acid, percent | 0.02 |
| Optical rotation | +48 |
| Softening point, ° C. | 65 |

EXAMPLE 1

A sample of the rosin weighing 400 grams was charged to a 1-liter, 3-necked flask to which was attached an agitator, a gas inlet tube for nitrogen gas, a reflux condenser, and an addition funnel with an inlet tube extending under the surface of the rosin. Heat was applied and the rosin temperature was raised to 300° C. under a blanket of nitrogen. At 300° C., 4 grams of acetic anhydride, dissolved in a little heptane, was added slowly and with agitation. The contents of the flask were then heated at 300° C. for 2 hours while the agitation was continued.

The treated rosin was made into its potassium soap by reaction with aqueous potassium hydroxide, and the soap was used as the emulsifying agent in the laboratory 1500 recipe in comparison with a soap of the same rosin that had not been heat-modified.

Eight polymerization bottles were prepared, four for each soap. After all components of the receipe were charged air was added to two of the bottles of each set in the amount of 4 ml. for each 100 grams of butadiene and styrene monomer and polymerization was carried out by shaking the bottles at 5° C. for 8 hours. The following results are in each case the average of two bottles.

PERCENT CONVERSION, MONOMERS TO POLYMER

| | No air | 6.2 ml. air |
|---|---|---|
| Control | 55.1 | 28.4 |
| Acetic anhydride, modified | 59.3 | 53.1 |

For purposes of comparison, the following figures from Example 3 of my above-identified copending application are given to show the results obtained when the same rosin was heat-modified by heating for 2 hours, but with no added acetic anhydride, after adding 6.2 ml. of air to the 1500 recipe.

| Heating temp. ° C.: | Percent conversion, monomers to Polymer |
|---|---|
| None (control) | 11 |
| 250 | 28 |
| 275 | 33 |
| 300 | 41 |

EXAMPLE 2

A 415 gram sample of the disproportionated rosin was heated for 1 hour at 300° C. in the equipment described in Example 1 after adding 8.3 grams of acetic anhydride. The treated rosin was converted into potassium soap which was tested in the 15 recipe, with and without addition of air, by the procedure described above. The results were as follows:

PERCENT CONVERSION, MONOMERS TO POLYMER

| | No air | 6.2 ml. air |
|---|---|---|
| Control | 46.8 | 26.7 |
| Acetic anhydride, modified | 51.3 | 48.2 |

EXAMPLES 3–6

The procedure of Example 2 was repeated, using the same rosin and 16.6 grams (4 percent) of acetic anhydride, a two-hour heating period, and temperatures of 250 and 300° C. Control runs were also made in which smaller proportions of acetic anhydride, or none at all, were used. In all cases the treated rosins were made into potassium soaps and tested in the 1500 recipe.

In Examples 5 and 6 a portion of the soap was acidified with hydrochloric acid and the liberated organic acids were extracted with ether and washed with water. Their acid number was then determined, and is tabulated below under the heading "extracted acids."

The conditions used and results obtained were as follows:

TABLE I

| Ex. | Conditions Time, hrs. | Temp., ° C. | Percent acetic anhydride | Percent conversion to polymer No air | 6.2 ml. air | Acid number Treated rosin | Extracted acids |
|---|---|---|---|---|---|---|---|
| 3 | 2 | 300 | None | | 36.0 | | |
|   | 2 | 300 | 4 | | 50.6 | | |
| 4 | 2 | 300 | None | 52.9 | 35.1 | | |
|   | 2 | 300 | 4 | 55.7 | 50.2 | | |
| 5 | 2 | 200 | 4 | 48.7 | 31.6 | 152.6 | 166.0 |
|   | 2 | 250 | 4 | 51.6 | 45.4 | 142.4 | 164.6 |
|   | 2 | 300 | 4 | 52.7 | 46.9 | 131.6 | 158.0 |
| 6 | 2 | 300 | 1.0 | 51.7 | 46.5 | 149.7 | 158.0 |
|   | 2 | 300 | 0.1 | 45.3 | 29.4 | 154.8 | |

EXAMPLES 7-8

Commercial grades of disproportionated wood rosin and gum rosin were heat-modified at 300° C. for 2 hours, with and without the addition of acetic anhydride, and samples of the resulting products were converted into potassium soaps and tested in the 1500 recipe. The percent conversion of monomers to polymer is given in the following table.

TABLE II

| Percent acetic anhydride | Wood rosin | | Gum rosin | |
| --- | --- | --- | --- | --- |
| | No air | 6.2 ml. air | No air | 6.2 ml. air |
| None | 45 | 36 | 42 | 32 |
| 1 | 51.3 | 44.7 | 48.8 | 42.6 |
| 4 | 52.5 | 50.8 | 51.2 | 43.3 |
| Unmodified (control) | 37 | 9 | 27 | 4 |

What I claim is:

1. An improved disproportionated rosin comprising a heat modified disproportionated rosin which has been heat treated at about 250° to 300° C. for about 1 to 4 hours in admixture with about 0.5% to 5% of its weight of acetic anhydride.

2. An improved disproportionated rosin soap selected from the group consisting of alkali metal, ammonium, and water soluble amine salts of the disproportionated rosin of claim 1.

References Cited
UNITED STATES PATENTS

| | | | |
| --- | --- | --- | --- |
| 3,377,334 | 4/1968 | McBride | 260—97.5 |
| 3,528,959 | 9/1970 | Patrick | 260—97.5 |
| 2,617,792 | 11/1952 | Floyd | 260—97.5 |
| 2,451,173 | 10/1948 | Richter | 260—97.5 |
| 3,518,214 | 6/1970 | Wheelus | 260—97.5 |

DONALD E. CZAJA, Primary Examiner

W. E. PARKER, Assistant Examiner

U.S. Cl. X.R.

260—102